United States Patent [19]

Okamoto

[11] 4,455,200
[45] Jun. 19, 1984

[54] METHOD FOR ETCHING ALUMINUM FOIL FOR ELECTROLYTIC CAPACITORS

[76] Inventor: Yoshiyuki Okamoto, 2406-4, Futamatachofutamata, Tenryu, Shizuoka, Japan, 433-33

[21] Appl. No.: 394,939
[22] PCT Filed: Jan. 25, 1982
[86] PCT No.: PCT/JP82/00022
§ 371 Date: Jun. 28, 1982
§ 102(e) Date: Jun. 28, 1982
[87] PCT Pub. No.: WO82/02620
PCT Pub. Date: Aug. 5, 1982

[30] Foreign Application Priority Data

Jan. 29, 1981 [JP] Japan .................................. 56-10798

[51] Int. Cl.³ ............................................. C25F 3/04
[52] U.S. Cl. ................................... 204/33; 204/129.4; 204/DIG. 9
[58] Field of Search ......... 204/DIG. 9, 129.4, 129.43, 204/32 R, 33, 58, 129.35

[56] References Cited

U.S. PATENT DOCUMENTS

| | | | |
|---|---|---|---|
| 2,699,382 | 1/1955 | Altenpohl | 204/129.35 X |
| 2,755,238 | 7/1956 | Turner | 204/33 |
| 2,930,741 | 3/1960 | Burger et al. | 204/129.4 X |
| 3,085,950 | 4/1963 | Thomas et al. | 204/129.75 X |
| 3,249,523 | 5/1966 | Post et al. | 204/129.43 |
| 3,477,929 | 11/1969 | Namikata et al. | 204/141 |
| 4,213,835 | 7/1980 | Fickelscher | 204/129.25 |
| 4,315,806 | 2/1982 | Arora | 204/129.4 |

FOREIGN PATENT DOCUMENTS

| | | |
|---|---|---|
| 29-1962 | 4/1954 | Japan . |
| 51-74267 | 6/1976 | Japan . |
| 856927 | 12/1960 | United Kingdom ............. 204/32 R |

OTHER PUBLICATIONS

Erickson, W., Bryant N., *Electrical Engineering Theory and Practice*, Wiley and Sons, New York (1952).

Primary Examiner—Howard S. Williams
Assistant Examiner—T. L. Williams
Attorney, Agent, or Firm—Holman & Stern

[57] ABSTRACT

Etching aluminum foil by (both) a high frequency current of at least 1 KHz and subsequently by an alternating current of less than 1 KHz remarkably increases the effective surface area for use in an electrolytic capacitor.

10 Claims, No Drawings

METHOD FOR ETCHING ALUMINUM FOIL FOR ELECTROLYTIC CAPACITORS

CROSS REFERENCE TO RELATED APPLICATION

The invention of this application is disclosed in corresponding International Application No. PCT/JP82/00022 filed Jan. 25, 1982, the benefit of which is being claimed.

TECHNICAL FIELD

This invention relates to a method for etching aluminum foil for electrolytic capacitors.

BACKGROUND ART

It is well known to electrochemically etch the surface of an aluminum foil used as an electrode of an electrolytic capacitor in order to increase its effective surface area. There is a d.c. etching method which applies a d.c. voltage with the aluminum foil as the anode and an a.c. etching method which applies an a.c. voltage between the aluminum foil and a carbon plate as the opposite electrode. Though deeply roughening the surface, the d.c. etching method has the problem that the mechanical strength is reduced. Though the surface is shallowly roughened in the a.c. etching process, it has problems in that aluminum is dissolved in the etching solution while only reducing the thickness. As a result it has low efficiency in that the effective area of the aluminum foil does not increase in proportion to the quantity of aluminum dissolved and on the contrary is likely to decrease from a certain point.

SUMMARY OF THE INVENTION

The present invention is directed to eliminate these problems with the prior art. The gist of the invention resides in that high frequency etching is effected prior to the a.c. etching so as to remarkably increase the efficiency of the effective area.

DISCLOSURE OF INVENTION

In accordance with the etching method of the present invention, formation of a film and corrosion are conducted simultaneously with each other by means of high frequency etching. Though this film, which is strong and corrosion-resistant, is formed on the surface of the aluminum foil with the progress in etching, corrosion is deeply effected. When a.c. etching is carried out subsequently, corrosion on the surface of the aluminum foil is restricted by the film formed by the high frequency etching while the a.c. etching continues the internal corrosion begun by the high frequency etching. Thus the effective surface area is increased much more when the aluminum is dissolved in the etching solution to a greater extent. Depending upon the thickness of the aluminum foil, etching from about 0.05 mm to 0.15 mm deep becomes possible by changing the etching time. Accordingly, etching treatment of 0.05 mm to 0.15 mm-thick aluminum foil is possible using a single device so that the efficiency of the etching work as well as its economy can be remarkably improved.

Thus, the present invention affords a method for etching aluminum foil for electrolytic capacitors, in which etching is carried out using a high frequency of at least 1 KHz and then using an alternating current. It is preferred that the voltage and current have an arbitrary waveform.

BEST MODE FOR CARRYING OUT THE INVENTION

Hereinafter, an embodiment of the present invention will be described in detail.

(1) Aluminum foil used in this embodiment:
   0.1 mm-thick softened aluminum foil of purity of at least 99.99%

(2) High frequency etching
   treating solution: a mixed aqueous solution consisting of an HCl-containing aqueous solution with an acid added to the former
   solution temperature: 60° C.
   electrolytic corrosion frequency: 1 KHz–100 KHz
   voltage: (to be changed in accordance with frequency)
   electrolytic corrosion time: 3 minutes (to be changed with the thickness of aluminum foil)

(3) A.C. etching
   treating solution: the same as in (2)
   solution temperature: 60° C. or below
   electrolytic corrosion frequency: 60 Hz
   current density: ordinary density
   electrolytic corrosion time: 3 minutes (to be changed with the thickness of aluminum foil)

After high frequency etching and a.c. etching were carried out in the first and second steps, respectively, the etched aluminum foil was washed with water and was subjected to formation treatment using a d.c. voltage of 20 V. The effective areas as measured by electrostatic capacitance are tabulated below.

| Frequency KHz | 1 | 2 | 3 | 5 | 10 | 30 | 50 | 100 |
|---|---|---|---|---|---|---|---|---|
| Electrostatic capacitance $\mu F/cm^2$ | 29.1 | 40.3 | 50.8 | 54.2 | 58.5 | 60.2 | 59.9 | 60.1 |

For comparison to the above data, the electrostatic capacitance of electrolytic capacitors can reach only 40 $\mu F/cm^2$ as disclosed in prior art such as U.S. Pat. No. 3,477,929, for example.

As described in the foregoing, the electrostatic capacitance of electrolytic capacitors can be markedly increased by using aluminum foil etched in accordance with the etching method of the present invention.

What is claimed is:

1. A method of etching aluminum foil for electrolytic capacitors comprising
   first etching using a high frequency alternating current of 1 KHz or above, and then
   second etching using an alternating current of a frequency lower than 1 KHz.

2. The method of claim 1 wherein the high frequency current is from 1 to 100 KHz.

3. The method of claim 2 wherein the second etching current frequency is about 60 KHz.

4. The method of claim 2 further comprising subjecting the etched foil to formation treatment using a direct current voltage of 20 V.

5. The method of claim 1 wherein the high frequency current is from 2 to 30 KHz.

6. The method of claim 1 wherein the second etching current frequency is about 60 Hz.

7. The method of claim 6 further comprising subjecting the etched foil to formation treatment using a direct current voltage of 20 V.

8. The method of claim 1 wherein the alternating current has an arbitrary waveform.

9. The method of claim 1 further comprising subjecting the etched foil to formation treatment using a direct current voltage of 20 V.

10. The method of claim 1 wherein the first etching is conducted in an aqueous acid solution at a solution temperature of about 60° C. and the second etching is conducted in an aqueous acid solution at a solution temperature of about 60° C. or below.

* * * * *